April 27, 1954 G. H. HOUCK ET AL 2,676,849
ADJUSTABLE WHEEL ASSEMBLY
Filed Aug. 31, 1950 2 Sheets-Sheet 1
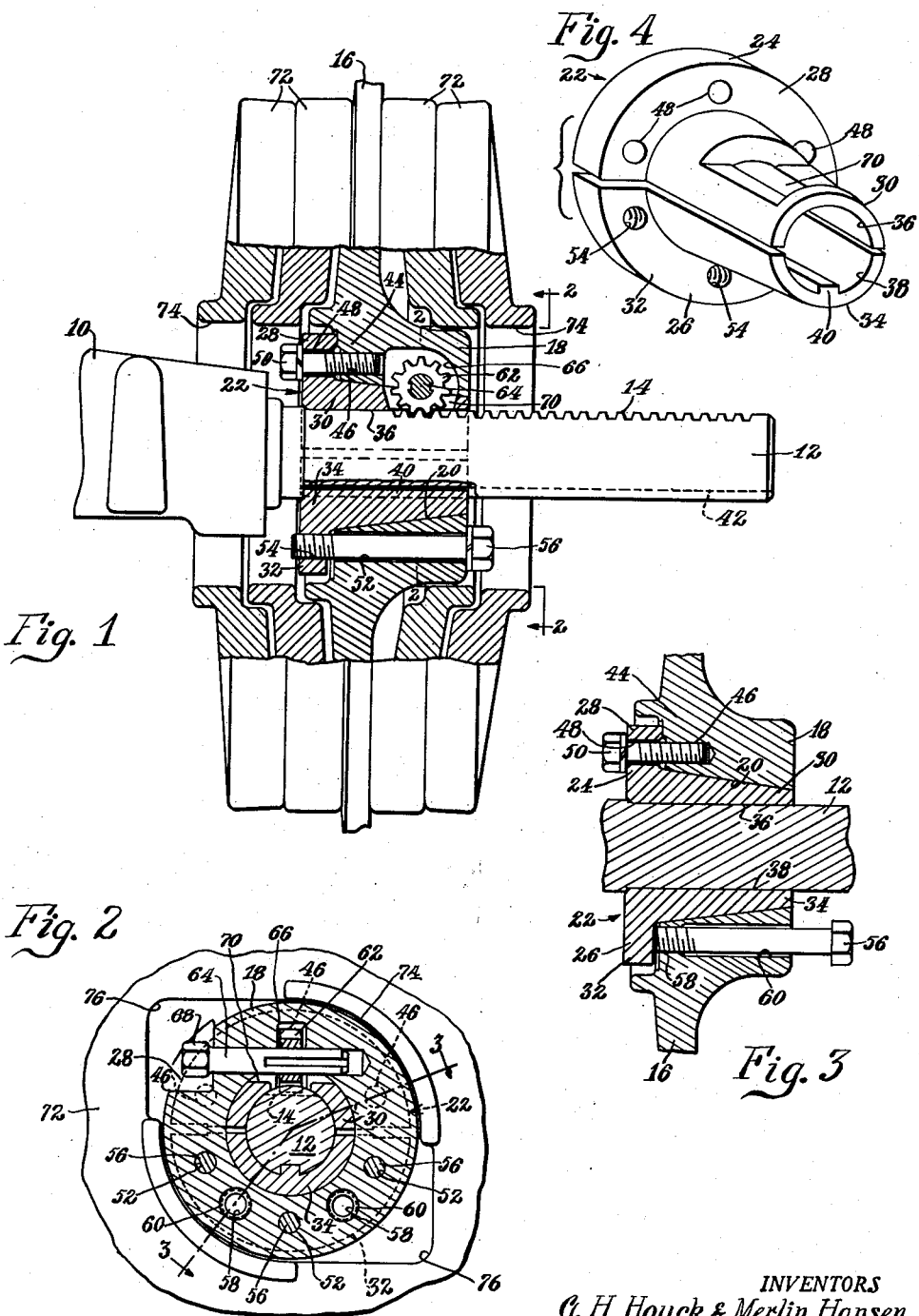
INVENTORS
G. H. Houck & Merlin Hansen
BY
Attorneys

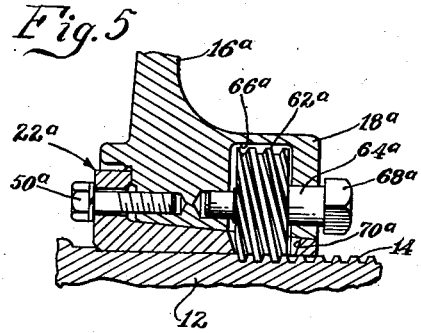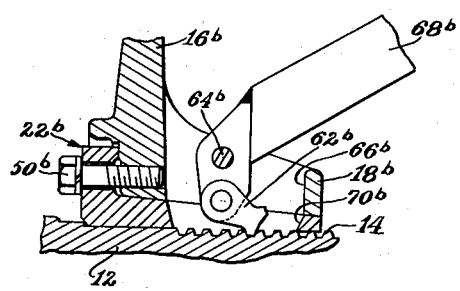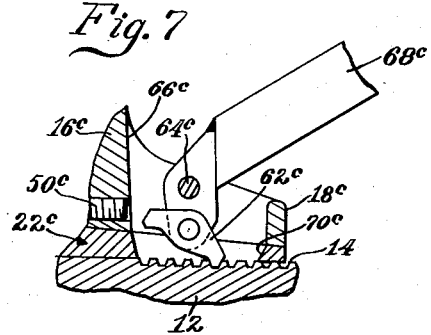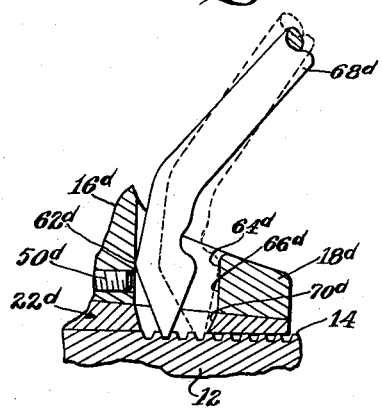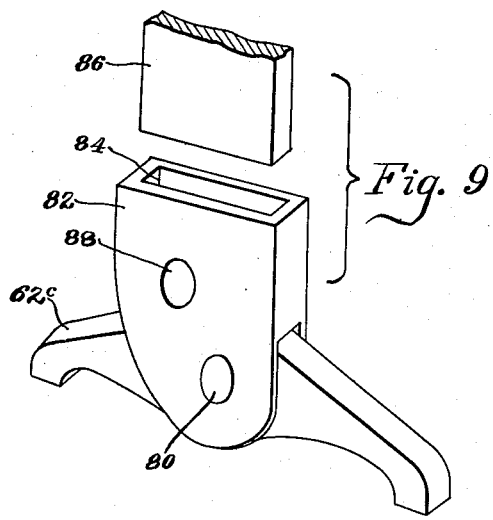

Patented Apr. 27, 1954

2,676,849

UNITED STATES PATENT OFFICE 2,676,849

ADJUSTABLE WHEEL ASSEMBLY

Gordon H. Houck and Merlin Hansen, Waterloo, Iowa, assignors to Deere Manufacturing Co., Dubuque, Iowa, a corporation of Iowa Application August 31, 1950, Serial No. 182,567

10 Claims. (Cl. 301—1)

1

This invention relates to an adjustable wheel assembly and more particularly to such assembly for use in agricultural tractors wherein the ease with which the traction wheels can be adjusted for tread variation is of prime importance.

Tread spacing or variation in agricultural tractors is possible by one means or another in all tractors of the so-called tricycle type; that is, tractors of the type having relatively widely spaced rear traction wheels and a centrally mounted steerable front truck of the type having either a single wheel or a pair of closely spaced wheels. Axial adjustability of the rear traction wheels on their axles is a requisite to the flexible use of the tractor for all purposes on the farm. For example, in plowing, it is desired that the wheels be spaced relatively closely apart, whereas in cultivating the wheels should be spaced relatively widely apart so that the tractor can straddle the crop in a pair of adjacent rows while the steerable front truck runs between that pair of rows. Tractors of the tricycle type are conventionally provided with a pair of relatively long, oppositely extending rear axles, each of which has a longitudinal keyway and on each of which the traction wheel is axially adjustable by means of a combination of a releasable clamping lug and pure physical effort on the part of the user.

Tractor wheels are, of course, quite heavy, particularly when loaded with wheel weights or liquid solution carried in the tires for weighting purposes. In addition, the outer surface of the axle becomes coated with an accumulation of rust and dirt and it is more often than not extremely difficut to release the hub from the axle for axial adjustment. Previous attempts to overcome the problem of inefficient wheel adjustment have centered about the provision of power means utilizing cooperative threaded portions either between the axle and the hub or between two relatively angularly movable parts, wherein the power of the tractor is utilized to rotate one wheel part relative to the other for effecting axial adjustment. Structures and mechanisms of this type are exemplified in the U. S. patents to Brown 2,099,194 and Strehlow 2,417,139. Although it may be said that these means are effective for the purposes, the very nature of the design thereof considerably increases the cost of the tractor to the purchaser. Utilization of the threaded-axle principle has been carried out in several designs in which it is necessary only to jack up the tractor, to release the hub from the axle, and to rotate the wheel on the threaded axle. A representative patented structure of this nature forms the subject matter

2 of the U. S. patent to Brown 2,472,742. A slight disadvantage is experienced in a design of this type, since the operator has little, if any, mechanical advantage in initially freeing the wheel from the axle, in addition to which he must manually rotate the wheel to secure new positions of adjustment.

The principal object of the present invention is to provide a wheel assembly comprising an axle or inner part and a wheel body or outer part in which relative adjustment between these parts for effecting tread variation is accomplished by intermeshing toothed means cooperative between the parts and having an exteriorly exposed force-receiving member to which force may be applied, as by a wrench or the like, for effecting rotation of one of the toothed means relative to the other. Specifically, the pair of toothed means comprises a rack running lengthwise or axially of the axle or inner part and a rotatable pinion carried by the wheel or outer part. Further, objects of the invention are to provide: An improved wheel assembly in which the parts are of simple design and easy to manufacture and maintain; a wheel assembly in which the position of the wheel is selectively fixed on the axle or equivalent inner part by novel clamping means including means selectively operative to release or engage the clamping means; to house the rotatable pinion or equivalent means within the hub where it will be free from the accumulation of dirt and rust; and a wheel assembly that may be readily furnished in sub-combination form for use with axles or equivalent inner parts having rack or equivalent toothed means thereon.

The foregoing and other important objects and desirable features inherent in and encompassed by the invention will become apparent as preferred embodiments of the invention are disclosed in the following specification and annexed sheets of drawings, in which Figure 1 is a transverse sectional view of the intermediate or central part of the wheel assembly;

Figure 2 is a sectional view taken on the line 2—2—2—2 of Figure 1;

Figure 3 is a sectional view as seen along the line 3—3 of Figure 2;

Figure 4 is an oblique view of the two-piece inner element;

Figure 5 is a fragmentary sectional view based on the structure of Figure 1 but showing a form of the invention in which a worm pinion instead of a spur pinion is utilized;

Figure 6 is a similar fragmentary sectional view of a further modified form of the invention in which a lever and pawl is utilized as the toothed means between the wheel and axle;

Figure 7 is another form of lever and pawl means patterned somewhat after the view in Figure 6;

Figure 8 is a fragmentary sectional view showing a further modification of the invention in which the toothed means comprises the toothed axle and a pinch bar or lever; and Figure 9 is an enlarged perspective view showing a modified form of construction applicable to Figures 6 and 7 in which the lever is removable from the pawl.

*Figs. 1–4*

The numeral 10 designates the axle housing portion of a tractor or equivalent vehicle. A conventional tractor of the type to which reference is made herein comprises a central, longitudinal body in which axle housings such as that shown at 10 project laterally and oppositely. The housing 10 is in effect a rigid part of the tractor body and hence is non-rotatable. This axle housing carries for rotation therein on suitable bearings not here material a laterally outwardly elongated axle 12 of circular section. This axle may be said to constitute an inner or central part of the wheel-supported structure of the tractor. It will be understood, of course, that a similar axle extends laterally at the opposite side of the tractor.

A portion of the outer cylindrical surface of the axle 12—and therefore an outer portion spaced radially from the axis of rotation of the axle or inner part—is provided with a plurality of axially equally spaced teeth transverse to the axle and forming toothed or rack means 14 paralleling the axis of the axle. The axial extent of the rack means 14 is, of course, consistent with the range of axial adjustment required and may be varied to suit individual desires.

The axle 12 carries thereon by means that will be described below in greater detail an outer wheel part 16 having a central hub 18 provided with a tapered bore or opening 20. This bore is substantially larger than the outside diameter of the axle 12 so that the hub encircles the axle in such manner as to provide an annular space normally filled by an intermediate or inner element shown in Figure 4 and designated in its entirety by the numeral 22. This element comprises a pair of complementary halves 24 and 26. The element half 24 has a radial, semi-circular flange 28 and a semi-conical, axially extending portion 30. The other element half 26 has a similar radial, semi-circular flange 32 and a semi-conical, axially extending part 34. When the two halves are assembled, the parts 30 and 34 combine to provide an annular part embracing the axle 12 and serving to mount the hub 18 on the axle. The parts 30 and 34 respectively have semi-cylindrical inner surfaces 36 and 38 that encircle and axially slidably fit the outer cylindrical surface of the axle. The part 34 has an internal, longitudinally extending key 40 which cooperates with a keyway 42 in the axle. Thus the element 22 is mounted on the axle for axially sliding relative to the axle. The key 40 and keyway 42 comprise means for constraining the element 22 and axle 12 for rotation together.

The tapered outer surfaces of the element parts 30—34 cooperate with the interior surface of the hub bore 20 to mount the hub 18 on the element 22. The hub 18 is provided with an inner radial portion 44, the upper half (as viewed in the drawings) of which is provided with a plurality—preferably three—of angularly spaced bolt holes or tapped bores 46. The radial flange portion 28 of the element half 24 has three complementary unthreaded bolt holes 48. Cap screws 50 pass through the bolt holes 48 into the tapped bores 46 to secure the radial portions 28 and 44 together.

The lower half of the radial portion 44 of the hub 18 is provided with a plurality—preferably three—of unthreaded bolt holes 52. The radial flange portion 32 of the element half 26 has three threaded bolt holes or tapped bores 54. When the components of the wheel are assembled, the bolt holes 52 and tapped bores 54 are alined. Relatively long cap screws 56 are passed through the bolt holes 52 and threaded into the tapped bores 54. When the bolts are tightened, the lower element half 26 is drawn into clamping relation between the hub bore 20 and outer cylindrical surface of the axle 12. Thus, when the cap screws 56 are tightened, the radial portions 24—44 and 26—44 are drawn together to clamp the hub 18 and element 22 onto the axle 12 so that the three are constrained for rotation together. The bolts or cap screws may be loosened to relax or relieve the clamping pressure. Hence, the bolts serve as means for selectively locking or releasing the wheel against or for relative movement axially of the axle 12. Since the element 22 is connected to the hub 18 by means of the bolts or cap screws 50 and 56, the bolts serve also as means for interconnecting the hub and element for rotation together.

In order to facilitate release of the clamping effect between the interior of the hub and the element 22, the lower half of the hub radial portion 44 is provided with a pair of angularly spaced tapped bores 58 dimensioned and threaded to receive two of the long cap screws 56. Each of the tapped bores 58 extends outwardly as an unthreaded counterbore 60, which avoids the necessity of threading the cap screws 56 throughout their length. The preferred method of releasing the clamping action on the lower half 26 of the element 22 is as follows: The center cap screw 56 is loosened until the inner surface of the head thereof is spaced approximately one-half inch from the outer surface of the hub. The remaining two cap screws 56 are unscrewed from the tapped bores 54 and withdrawn from the bolt holes 52. These two cap screws are then inserted through the counterbores 60 and threaded into the tapped bores 58. These tapped bores 58 open inwardly to imperforate portions of the radial flange 26 on the element 22. Hence, the cap screws 56 may be tightened to exert an axially separating force against the lower element half 26. Release of this element half will, of course, free the entire wheel assembly for movement axially relative to the axle 12.

For the purpose of applying force to the wheels to move the same axially relative to the axle when the clamping means has been released, the wheel hub 18 carries rockable toothed means in the form of a spur pinion 62 keyed to a member or shaft 64 journaled in the hub 18 on an axis spaced from and crosswise relative to the axis of the axle 12. The hub is cut out interiorly at 66 to house the pinion 62. The shaft or member 64 extends exteriorly of the hub and is provided with an integral headed end 68 to which force may be applied, as by a wrench or other suitable tool for the purpose of effecting rotation of the pinion 62, thus causing the released wheel assembly to walk along the axle of the rack 14. The upper element half 24 has its semi-conical part 30 cut out or provided with a radially directed opening 70 through which the pinion projects radially inwardly for meshing with the rack 14. In other words, the opening 70 in the element 24 exposes a portion of the rack 14.

The wheel 16 is illustrated as having mounted thereon a plurality of circular wheel weights 72, each of which is provided with a central opening 74 by means of which access may be had to the cap screws 50 and 56. Each of the openings 74 is shaped as shown at 76 in Figure 2 to provide for access to the headed end of the member or pinion shaft 64. Two diagonally opposite openings 76 are provided so that the wheel weights may be assembled in either of two positions.

Operation of the assembly to adjust the wheel part relative to the axle or inner part is as follows: The side of the tractor at which the change is to be made should be jacked up so that the tire on the wheel 16 is clear of the ground. The wheel is then rotated until the rack 14 is uppermost. The central cap screw 56 is backed off or loosened as aforesaid and the other two cap screws 56 are removed and replaced in the tapped bores 58. These cap screws are then tightened to force the lower element half 26 axially away from the hub 18, thus releasing the clamping action between the elements and the axle, whereupon the wheel is freed from the axle. A wrench or other suitable tool is then applied to the headed end 68 of the pinion shaft 64 and moved angularly in the desired direction so that the wheel is caused to walk along the rack 14. Since the upper element half 24 is still connected to the wheel hub 18 by means of the cap screws 50, and since the lower half is still joined to the hub by the loosened center cap screw 56, the wheel and element 22 will remain assembled. When the desired position of the wheel is obtained, it is merely necessary to remove the cap screws 56 from the tapped bores 58, to replace them in the outermost bolt holes 52 and to tighten all the cap screws 56 to again exert clamping pressure between the hub 18 and the axle 12 by means of the clamping element 22.

The utilization of the cap screws 56 in the manner aforesaid facilitates release of the wheel assembly from the axle so that, even though the wheel might normally be difficult to move because of long use without adjustment, breaking loose of the wheel is easily effected. Since the interior housing portion 66 of the hub 18 substantially completely encloses the pinion 62 and the associated portion of the rack 14, these portions of the toothed means will be free from accumulation of dirt and rust and initial rotation of the pinion 62 will be relatively easy. Excessive accumulation of dirt and rust or other matter on the exteriorly exposed portion of the rack 14 may be readily removed before adjustment is attempted. If the accumulation is of a minor nature, there will still be no difficulty in walking the wheel along the axle by means of the pinion 62 and rack 14. The components of the wheel assembly are relatively few and are of simple design. Therefore, adjustment may be easily effected with a minimum of effort and without the use of special tools. The assembly is relatively inexpensive, especially when compared with the power-driven, threaded-axle type of wheel adjustments previously referred to.

*Figure 5*

This form of the invention utilizes a design that is capable of use with the axle 12 having the toothed means or rack 14 of Figure 1. The general construction follows that of Figure 1 and, to the extent that the various components are similar, the reference characters used in Figure 1 will be used in Figure 5, with the addition of the exponent "a."

The wheel 16a has a hub portion 18a carried on the axle 12 by means of a split inner assembly 22a similar to that shown in Figure 4. The same cap screw assembly and disassembly arrangement may be utilized, one of the cap screws appearing at 50a. In place of the spur pinion 62, this form of the invention utilizes a worm pinion 62a rotatably carried on a short shaft 64a having an exterior headed end 68a. The interior of the hub 18a is recessed to form a housing or enclosure 56a for the pinion 62a. One half of the inner mounting assembly 22a is cut out at 70a so that the pinion 62a may engage the teeth on the rack 14. Other details of construction may be similar to those illustrated and described in connection with Figures 1–4.

Operation of the modified form of the invention as shown in Figure 5 will follow that of the form of the invention shown in Figures 1–4. The two forms are basically similar, both utilizing toothed means in which one component of said means is rotatable on an axis spaced from the axis of the axle, thus avoiding threading of the entire wheel for rotation about the axle.

*Figure 6*

Again, the basic design of Figures 1–4 will be utilized and, since the components are similar or identical, the same reference characters will be used, with the addition of the exponent "b." Clearly visible in Figure 6 are the axle 12 having the toothed rack 14; the wheel 16b having the hub 18b; the mounting assembly 22b with its cap screw 50b and cut-out at 70b to accommodate toothed means here in the form of a lever 68b pivoted on a removable pin 64b and carrying a pivoted pawl 62b. The hub 18b is cut out at 66b to accommodate the lever and pawl.

In normal use of the vehicle in which this form of the invention is utilized, the lever 68b is dismounted by means of removing the pin 64b. When it is desired to change the tread of the wheel, loosening of the wheel on the axle is accomplished by means of the procedure outlined above in connection with Figures 1–4. The lever 68b is then installed by mounting it in the hub 18b by means of the pin 64b. The pawl 62b is allowed to drop into place (the rack 14 being uppermost) and the lever rocked until the desired adjustment is accomplished. The pawl 62b may be turned about its pivot on the lever 68b so that the wheel may be moved in either direction.

*Figure 7*

The basic design utilized in the other forms of the invention is followed here and corresponding parts are identified by similar reference characters, to each of which has been added the exponent "c." The wheel 16c has the hub 18c provided with an opening or recess 66c for pivotally carrying on a removable pin 64c a lever 68c to the lower end of which is pivotally connected a double pawl 62c. Opposite arms of the pawl are selectively engageable with the rack 14 of the axle 12.

Also visible in the view are a part of the mounting assembly 22c and cap screw 50c.

As in Figure 6, the lever 68c is normally dismounted from the wheel 16c by removing the pin 64c. When it is desired to effect tread adjustment, the loosening of the wheel relative to the axle 12 is accomplished as outlined above. The lever and pawl means is mounted on the hub by replacing the pin 64c. Rocking of the lever 68c with the pawl 62c engaged with the rack 14 will effect axial movement of the wheel relative to the axle. Here again, as in the modifications previously described, the toothed means includes a member rockable about an axis spaced from the axis of the axle.

Figure 8

The same basic components of the assembly will be found in this form of the invention. These are identified by similar reference characters to each of which has been added the exponent "d." The wheel 16d has a hub 18d which is mounted on the axle 12 by means of a mounting assembly 22d, one of the cap screws for which is visible at 50d. The hub 18d is apertured or otherwise cut out at 66d in alinement with an opening 70d in the assembly 22d, thus exposing a portion of the rack 14 of the axle 12 to the application of a tool in the form of a pinch bar 68d. This pinch bar may fulcrum at 62d or at 64d, depending upon the direction in which it is desired to move the wheel relative to the axle 12. Each fulcrum therefore provides an axis corresponding to the axis of rotation of the pinion or lever previously described.

Figure 9

This form of the invention shows a lever and pawl arrangement patterned after the construction shown in Figure 7. The pawl 62c is pivoted at 80 on a lever-receiving member 82 having a pocket or recess 84 to receive a lever 86. The lever-receiving member 82 is apertured at 88 to receive the removable pin 64c. In this case, however, the pin need not be removed, since the lever 86 may be withdrawn from the pocket or socket 84 when the lever is not in use. The applicability of this phase of the invention to the structure of Figure 6 is thought to be apparent and no further detailed description is deemed necessary.

Various other features of the invention not specifically enumerated herein will undoubtedly occur to those versed in the art, as likewise will numerous modifications and alterations in the preferred embodiments of the invention illustrated, all of which may be achieved without departing from the spirit and scope of the invention as defined in the appended claims.

What is claimed is:

1. An adjustable wheel and axle assembly, comprising: an elongated axle provided along a lengthwise portion of its periphery with axially spaced teeth forming a rack; a two-piece inner element surrounding the axle and including an axial tubular portion having an inner cylindrical surface axially slidably fitting the axle and an outer annular tapered portion formed about the axis of the cylindrical surface, said element further having a radial flange at the large end of the taper and said flange being formed with a plurality of bolt holes lying in a bolt circle outside the tapered portion, certain of said holes being threaded, said element having a radial opening therein exposing the axle rack to the exterior of said element, and said element also having key means cooperative with the axle to constrain the axle and element for rotation together; a wheel having a hub encircling the axle and inner element, said hub having an interior tapered bore complementing and fitting onto the outer tapered portion of the inner element, and further having a radial portion positionable adjacent the radial flange of the element and provided with complementary bolt holes, certain of which are alined with the threaded bolt holes of the radial flange and certain of which are threaded and alined with imperforate portions of the radial flange; a plurality of bolts selectively receivable through the unthreaded bolt holes of the hub and threadable into the threaded bolt holes of the radial flange to draw the hub and element axially together for clamping the hub, element and axle, or threadable into the threaded bolt holes of the hub to engage the imperforate portions of the radial flange for forcing the hub and at least one piece of the element axially apart to relieve the clamping pressure; and a toothed member rockably associated with the hub for entering through the aforesaid radial opening in the tubular portion of the element to mesh with the axle rack, said toothed member including means accessible from outside the hub for rocking said toothed member to shift the hub axially relative to the axle when said clamping pressure is relieved.

2. An adjustable wheel and axle assembly, comprising: an elongated axle provided along a lengthwise portion of its periphery with axially spaced teeth forming a rack; a clampable inner element having an inner portion axially slidably embracing the axle and an outer clamp-effecting portion, said element further having a radial portion formed with a threaded bolt hole, said element having a radial opening therein exposing the axle rack to the exterior of said element and said element having key means cooperative with the axle to constrain the axle and element for rotation together; a wheel having a hub encircling the axle and inner element, said hub having an interior clamp-effecting portion complementing the clamp-effecting portion of the inner element, and further having a radial portion positionable adjacent the radial portion of the element and provided with a pair of bolt holes, one of which is alined with the threaded bolt hole of the radial element portion and the other of which is threaded and alined with an imperforate portion of the radial element portion; a bolt selectively receivable through the unthreaded bolt hole of the hub and threadable into the threaded bolt hole of the radial element portion to draw the hub and element axially together for clamping the hub, element and axle via said clamp-effecting portions, or threadable into the threaded bolt hole of the hub to engage the imperforate portion of the radial element portion for forcing the hub and element axially apart to relieve the clamping pressure; and a toothed member rockably associated with the hub for entering through the aforesaid radial opening in the element to mesh with the axle rack, said toothed member including means accessible from outside the hub for rocking of said toothed member to shift the hub axially relative to the axle when said clamping pressure is relieved.

3. An adjustable wheel and axle assembly, comprising: an axle; an inner element slidable axially of the axle and having means cooperative with the axle to constrain the element for rotation with the axle, said element further having a portion selectively engageable with or releasable from the axle to respectively lock or release the element as respects axial sliding on the axle, said element further having an opening therein directed radially as respects the axle and positioned to expose a portion of the outer surface of the axle; a wheel having a hub encircling the axle and element; means on the hub cooperative with the element locking portion and selectively operative to lock or release said locking portion; means cooperative between the hub and element for constraining the two for rotation and axial movement together; and means cooperative between the hub and axle for forcibly moving the hub and element axially of the axle, including toothed means on the aforesaid surface portion of the axle that is exposed through the opening in the element and cooperative toothed means associated with the hub and meshable through said opening with the first toothed means, one of said toothed means being rockable relative to the other about an axis other than the axle axis, and said rockable toothed means having an exteriorly exposed force-receiving member through which force may be applied for effecting rocking thereof.

4. An adjustable wheel assembly for a vehicle having wheel-supporting structure, comprising: an inner part carried by the supporting structure for rotation about an axis and having an outer portion spaced radially from said axis; an intermediate part supported on the inner part and axially shiftable relative thereto; means cooperative between the parts for constraining the two for rotation together about said axis; lock and release means on the intermediate part cooperative with the outer portion of the inner part and selectively effective to lock or release the two parts against or for relative axial shifting; an outer part concentric with the inner part and supported on said inner part by means of the intermediate part; means on the outer part cooperative with the intermediate part for constraining the two for both rotation and axial movement together about and along said axis; means on the outer part cooperative with the lock and release means of the intermediate part for selectively locking or releasing the intermediate part as respects axial shifting on the inner part; and means cooperative between the inner and outer parts for forcibly moving the outer and intermediate parts axially relative to the inner part, including first and second meshing toothed means respectively on the outer and inner parts, one of said toothed means being rockable about an axis other than said axis of the inner part, and said rotatable means having an exteriorly exposed force-receiving member through which force may be applied for effecting rocking thereof.

5. A wheel and axle assembly, comprising: an axle having a portion of its outer surface formed with axially extending rack means; a wheel hub having a central bore larger than and adapted to encircle the axle, a portion of said bore being tapered in an axial direction; a clamping inner element carried by the hub within said bore and fitting the axle to carry the hub on the axle for movement axially of the axle, said element having means engageable with the axle to constrain the element for rotation with the axle, and said element having a tapered portion cooperative with the tapered portion of the hub bore; lock and release means cooperative between said portions for selectively clamping or releasing the element to or from the axle to lock or release the element against or for axial shifting on the axle; means constraining the hub and element for rotation together; and toothed means rockably associated with the hub and meshable with the axle rack means, said toothed means including an exteriorly exposed member through which force may be applied for effecting axial movement of the hub and element on the axle when the lock and release means is released.

6. A wheel and axle assembly, comprising: an axle having a portion of its outer surface formed with axially extending rack means; a wheel hub having a central bore larger than and adapted to encircle the axle, a portion of said bore being tapered in an axial direction; a clamping inner element carried by the hub within said bore and fitting the axle to carry the hub on the axle for movement axially of the axle, said element having means engageable with the axle to constrain the element for rotation with the axle, and said element having a tapered portion cooperative with the tapered portion of the hub bore; a pair of axially spaced radial portions respectively on the hub and element and relatively axially movable; screw means for selectively moving said radial portions toward or away from each other to effect clamping or unclamping cooperation between said tapered portions; means constraining the hub and element for rotation together; and toothed means rockably associated with the hub and meshable with the axle rack means, said toothed means including an exteriorly exposed member through which force may be applied for effecting axial movement of the hub and element on the axle when the lock and release means is released.

7. A wheel and axle assembly, comprising: an axle having a portion of its outer surface formed with axially extending rack means; a wheel hub having a central bore larger than and adapted to encircle the axle, a portion of said bore being tapered in an axial direction; a clamping inner element having an annular part within the hub bore and encircling the axle to mount the hub on the axle for axial movement relative to the axle, said annular part having a tapered portion cooperative with the tapered portion of the hub bore, said element having means engageable with the axle to constrain the element and axle for rotation together, and said annular part having a radially directed opening therein exposing the axle rack means; lock and release means cooperative between said portions for selectively clamping or releasing the element to or from the axle to lock or release the element against or for axial shifting on the axle; means constraining the hub and element for rotation together; and toothed means rockably associated with the hub and projecting radially inwardly through said opening and meshing with the axle rack means, said toothed means including an exteriorly exposed member through which force may be applied for effecting axial movement of the hub and element on the axle when the lock and release means is released.

8. For use with a rotatable axle having a portion of its outer surface formed with axially extending rack means: a wheel hub having a central bore larger than and adapted to encircle the axle, a portion of said bore being tapered in an axial direction; a clamping inner element carried by the hub within said bore and fitting the axle to carry the hub on the axle for movement axially of the axle, said element having means engageable with the axle to constrain the element for rotation with the axle, and said element having a tapered portion cooperative with the tapered portion of the hub bore; lock and release means cooperative between said portions for selectively clamping or releasing the element to or from the axle to lock or release the element against or for axial shifting on the axle; means constraining the hub and element for rotation together; and toothed means rockably associated with the hub and meshable with the axle rack means, said toothed means including an exteriorly exposed member through which force may be applied for effecting axial movement of the hub and element on the axle when the lock and release means is released.

9. The invention defined in claim 8, further characterized in that: the inner element is encircled by the hub and is annular to encircle the axle, and said inner element has a radially directed opening therein through which the toothed means may project radially inwardly for engagement with the axle rack means.

10. The invention defined in claim 8, further characterized in that: the lock and release means comprises a pair of axially spaced radial portions, one on the hub and the other on the element, and screw means for selectively moving said radial portions toward or away from each other to effect clamping or unclamping cooperation between said tapered portions.

References Cited in the file of this patent

UNITED STATES PATENTS

| Number | Name | Date |
|--------|------|------|
| 937,530 | Hustan | Oct. 19, 1909 |
| 1,758,584 | Rarig | May 13, 1930 |
| 2,472,742 | Brown | June 7, 1949 |